(12) United States Patent
Gebert

(10) Patent No.: US 8,233,649 B2
(45) Date of Patent: Jul. 31, 2012

(54) HEARING AID DEVICE WITH A TRANSDUCER PROTECTION FACILITY

(75) Inventor: Anton Gebert, Kleinsendelbach (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 317 days.

(21) Appl. No.: 12/542,106

(22) Filed: Aug. 17, 2009

(65) Prior Publication Data

US 2010/0040250 A1    Feb. 18, 2010

(30) Foreign Application Priority Data

Aug. 18, 2008 (DE) .......................... 10 2008 038 213

(51) Int. Cl.
 *H04R 25/00* (2006.01)
(52) U.S. Cl. ......................... 381/316; 381/325
(58) Field of Classification Search .................. 381/325, 381/396, 316, 369
See application file for complete search history.

(56) References Cited

U.S. PATENT DOCUMENTS

| | | | |
|---|---|---|---|
| 4,972,488 A | 11/1990 | Weiss et al. | |
| 5,327,500 A | 7/1994 | Campbell | |
| 5,970,157 A | 10/1999 | Yoest | |
| 6,134,333 A | 10/2000 | Flagler | |
| 6,164,409 A | 12/2000 | Berger | |
| 2005/0074138 A1 | 4/2005 | Saltykov | |
| 2005/0249366 A1* | 11/2005 | Westerkull | 381/151 |
| 2006/0153418 A1* | 7/2006 | Van Halteren | 381/396 |
| 2007/0206826 A1* | 9/2007 | Rohrlein | 381/325 |

FOREIGN PATENT DOCUMENTS

| | | |
|---|---|---|
| DE | 3616648 A1 | 11/1987 |
| DE | 3802250 C1 | 10/1988 |
| DE | 19640796 A1 | 4/1998 |
| DE | 1020006008044 B3 | 5/2007 |
| EP | 310866 A1 | 4/1989 |
| EP | 0312517 A2 | 4/1989 |
| EP | 1562400 A2 | 8/2005 |
| WO | 9948328 A1 | 9/1999 |
| WO | WO 0003561 A1 | 1/2000 |

* cited by examiner

*Primary Examiner* — Yuwen Pan
*Assistant Examiner* — Phan Le

(57) ABSTRACT

With a hearing aid device which can be worn in the ear, a barometric pressure equalization which is needed for the sound transducer, such as a microphone or receiver, is to be achieved in a simple and cost-effective fashion. To this end, a converter protection facility is proposed with a membrane, with a pressure equalization channel, which connects a sound channel to the interior of the hearing aid device, extends through the transducer protection facility at least in one section. Replacing the transducer protection facility thus also replaces this subsection of the pressure equalization channel. A possible blockage of the pressure equalization channel which exists in this region as a result of dirt or moisture is eliminated as a result.

7 Claims, 2 Drawing Sheets

HEARING AID DEVICE WITH A TRANSDUCER PROTECTION FACILITY

CROSS REFERENCE TO RELATED APPLICATIONS

This application claims priority of German application No. 10 2008 038 213.2 filed Aug. 18, 2008, which is incorporated by reference herein in its entirety.

FIELD OF THE INVENTION

The invention relates to a hearing aid device comprising a housing, an input transducer for receiving an input signal and converting said signal into an electrical input signal, a signal processing unit for processing and amplifying the electrical input signal and for generating an electrical output signal, an output transducer for converting the electrical output signal into an output signal which can be perceived by a user as an acoustic signal and a transducer protection facility which can be detachably connected to the hearing aid device and has a membrane support, a membrane and a sound channel, for protecting the input transducer or the output transducer against contamination.

BACKGROUND OF THE INVENTION

Hearing aid devices, in particular hearing aid devices which can be worn in the ear (ITE) are exposed to contamination with ear wax (cerumen). With ITEs, the cerumen frequently penetrates the sound outlet opening of the hearing aid device and blocks the sound channel between the hearing aid device loudspeaker, also known as the receiver, and the sound outlet opening. This causes a number of problems, ranging from acoustic impairments to the total failure of the affected hearing aid device.

There are currently many approaches to preventing the penetration of cerumen into ITEs. Protection apparatuses in the form of a cap or bracket are generally used, which can either be embodied as part of the hearing aid device housing (see DE 38 02 250 C1 or U.S. Pat. No. 5,327,500) or as an insert or attachment into the sound channel and/or onto the hearing aid device (see U.S. Pat. No. 5,327,500 or EP 0 312 517 A2). Cerumen protection facilities which narrow the sound channel are also known, in some instances having lattice or cavity-type barriers and being intended for insertion into the sound channel or for attachment to a grommet (see U.S. Pat. Nos. 4,972,488; 5,970,157; WO 00/03561 A1 or DE 36 16 648 A1).

Cleaning of such cerumen protection facilities represents a significant problem. In many instances the cerumen protection facility has to be replaced from time to time, which means that elderly hearing aid device wearers have to visit the acoustician, which is often problematic. Cerumen protection facilities have thus been repeatedly proposed, which have a porous or non-porous (gas-tight) membrane (see EP 310 866 A1; DE 196 40 796 A1 or U.S. Pat. No. 6,164,409) and cover the sound outlet opening. The penetration of cerumen is largely prevented as a result. Membranes of this type are also easier to clean than other cerumen protection facilities. But they also have to be exchanged as easily as possible in the event of damage. Fixed installation is thus prohibited.

Attachable cerumen protection facilities have ultimately not been successful because of the additional space requirement. The insertable cerumen protection facilities used to date are in most cases disadvantageous in that they reduce the acoustically active cross-section of the sound channel and may as a result lead to acoustic disadvantages.

Gas-tight membranes basically offer the greatest protection, but nevertheless require the use of modified receivers in order to ensure the barometric pressure equalization. The associated outlet on the device exterior (faceplate) likewise involves a corresponding additional space requirement. It must also be ensured that the cerumen protection facility is securely connected to the sound channel and forms a tight seal therewith. Until now this has generally been achieved in the case of a cerumen protection facility which can be inserted into the sound channel, by a thickening close to the sound channel, said thickening being embodied as a flange or barb or having other elements such as studs, knobs etc.

US 2005/0074138 A1 discloses a receiver support, in which a sound tube is located between a sound outlet opening of the receiver and a holder in the hearing aid device housing.

A hearing aid device with a receiver and a gas-tight cerumen protection facility is known from the patent application DE 10 2006 008 044 B3, in which a pressure equalization channel opens into the sound channel between the receiver and the cerumen protection facility. The special arrangement of the pressure equalization channel generally prevents a blockage of the same. However in the rare instances when the pressure equalization channel is blocked, cleaning is difficult.

SUMMARY OF THE INVENTION

The object of the present invention is therefore to easily ensure the intended function of the pressure equalization channel in the case of a hearing aid device with a transducer protection facility and a pressure equalization channel.

This object is achieved by a hearing aid device comprising the features according to the independent claim. Advantageous developments are characterized by the dependant claims.

An input signal is received in a hearing aid device by means of an input transducer and is converted into an electrical input signal. At least one microphone which receives an acoustic input signal and converts it into an electrical input signal is usually used as an input transducer. Modern hearing aid devices frequently comprise a microphone system with several microphones in order to achieve a reception which is dependent upon the direction of arrival of acoustic signals, a directional characteristic. Telephone coils or antennae for receiving electromagnetic input signals and converting said signals into electrical input signals are however also usual as input transducers. The input signals converted into electrical input signals by means of the input transducer are fed to a signal processing unit for further processing and amplification. The further processing and amplification usually takes place in order to equalize the individual hearing loss of a user as a function of the signal frequency of the input signal. The signal processing unit supplies an electrical output signal to its output, which is fed to the ear of the hearing aid device wearer by way of an output transducer, so that said hearing aid device wearer perceives the output signal as an acoustic signal. Receivers which generate an acoustic output signal are usually used as output transducers. Output transducers for generating mechanical oscillations are however also known, the latter directly exciting certain parts of the ear, like for instance the ossicles. Output transducers which directly stimulate nerve cells in the ear are also known. A hearing aid device also includes a voltage source (battery or rechargeable battery) for supplying power to the electronic components. Control elements (on/off switch, program switch, volume controller etc.) may also be available.

The invention can also be used with all known types of hearing aid device, for instance with hearing aid devices which can be worn behind the ear, hearing aid devices which can be worn in the ear, implantable hearing aid devices or pocket hearing aid devices. The hearing aid device according to the invention can also form part of a hearing device system comprising several devices for supplying a hard-of-hearing person, e.g. part of a hearing device system comprising two hearing aid devices worn on the head for the binaural supply or part of a hearing device system comprising a device which can be worn on the head and a processor unit which can be worn on the body.

Furthermore, not all components of an inventive hearing aid device have to be arranged in the same housing. A hearing aid device which can be worn behind the ear can include an otoplastic which can be worn in the ear for instance, with the receiver and the transducer protection facility being attached into and/or onto the otoplastic.

The transducer protection facility can be used both to protect one or several microphones in an inventive hearing aid device as well as to protect the receiver against dirt, in particular cerumen, moisture etc.

As in the case of the hearing aid device known from the patent application DE 10 2006 008 044 B3, in the hearing aid device according to the invention the membrane of the transducer protection facility also prevents the penetration of dirt or moisture into the pressure equalization channel. However in the rare instances when the pressure equalization channel becomes blocked, for example as a result of a damaged membrane in the transducer protection facility, the invention is advantageous in that at least one section of the pressure equalization channel can be replaced together with the transducer protection facility. Thus the transducer protection facility is in any case replaced from time to time as a part that is subject to wear and tear. The risk of blockage of the pressure equalization channel is significantly reduced and/or a blocked pressure equalization channel is easily replaced by a new, unblocked pressure equalization channel.

One advantageous embodiment of the invention provides for the pressure equalization channel to be subdivided into at least two subsections, with the first subsection extending through the transducer protection facility and the second subsection extending through the housing or the otoplastic of the relevant hearing aid device, as a result of which a continuous channel is created between the sound channel and the interior of the relevant hearing aid device and/or otoplastic. The section of the pressure equalization channel which extends through the transducer protection facility and which can therefore be easily replaced advantageously has a smaller cross-section than the section of the pressure equalization channel which extends through the housing and/or the otoplastic of the hearing aid device. This thus ensures that as a result of a damaged membrane in the transducer protection facility for instance, penetrating dirt particles already cling to the first section of the pressure equalization channel and therefore after the damaged transducer protection facility has been replaced, the intended function of the pressure equalization channel is fully ensured again.

A barometric pressure equalization for the receiver or the microphone of a hearing aid device is then particularly necessary if the used transducer protection facility has an air-impermeable, non-porous membrane. A barometric pressure equalization according to the invention may nevertheless also be advantageous with the use of a porous membrane, since the contamination of a porous membrane, in particular due to cerumen or moisture may result in this losing its air permeability and thus pressure equalization no longer being ensured through the membrane.

It is generally completely adequate for the barometric pressure equalization if both the transducer protection facility and also the housing of the relevant hearing aid device comprise a single pressure equalization channel in each instance. It is however naturally also possible for the transducer protection facility or the housing of the hearing aid device (or both) to include several pressure equalization channels in each instance. The pressure equalization itself is as a result even still ensured if a pressure equalization channel is blocked.

A hearing aid device according to the invention which is worn in the ear does not necessarily have to have all the components which are needed in order to supply a hard-of-hearing person within the same housing. It is instead also possible for the hearing aid device according to the invention to only contain the receiver in a housing worn in the auditory canal and for all other necessary electrical or electronic components to be contained in a further device which is worn outside the auditory canal, for instance behind the ear. The connection existing between the additional device and the hearing aid device is preferably wire-bound, it may however also be embodied for instance as an electromagnetic radio link.

A hearing aid device according to the invention is preferably produced with a computer-assisted production method, wherein data relating to the individual course of the ear canal of a person is determined. A virtual image of a housing shell is then initially created from the digital representation of the internal contours of the relevant ear canal, said housing shell fitting snugly in respect of the relevant ear canal. Components in the hearing aid device (microphone, receiver, voltage source, electronic system etc.) can already be positioned virtually in this computer model. The localization of the transducer protection facility and the holder required to secure it in the housing of the hearing aid device can therefore already be determined using the computer model. Furthermore, the start and end point of the pressure equalization channel according to the invention and the precise layout of the pressure equalization channel can already be planed with the aid of the computer model. The shell of the hearing aid device with the integrated holders for the transducer protection facility and the pressure equalization channel according to the invention is then produced in a computer-controlled manufacturing process, e.g. by means of laser sintering, stereolithography or a thermojet pressure method. An actual hearing aid device housing is produced here precisely according to the image of the three-dimensional computer model.

BRIEF DESCRIPTION OF THE DRAWINGS

The invention is described in more detail below with reference to an exemplary embodiment, in which.

DETAILED DESCRIPTION OF THE INVENTION

Figure 1:
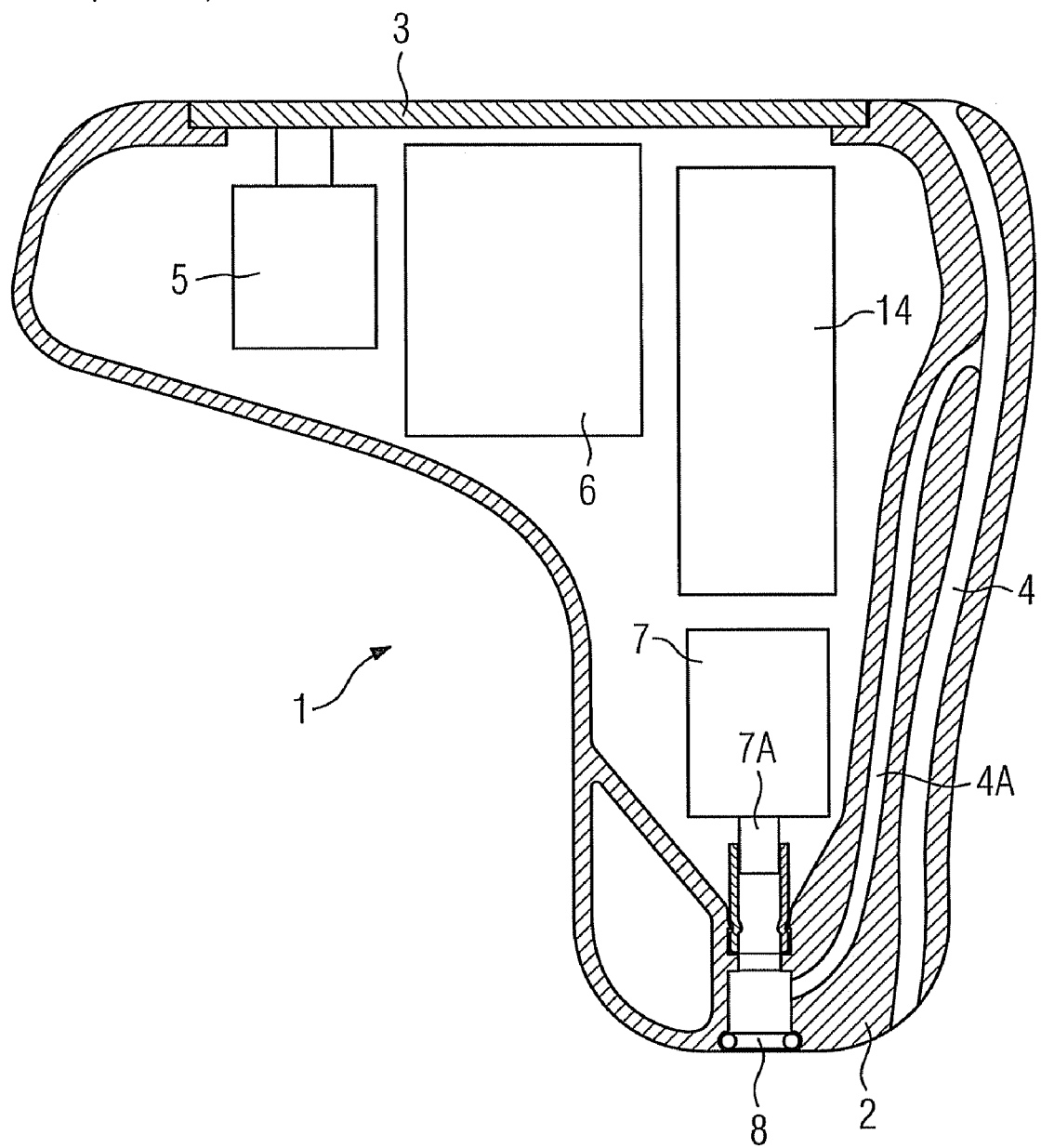
FIG. 1 shows a hearing aid device which can be worn in the ear as claimed in the prior art and FIG. 2 shows a section in the region of the sound outlet opening of a hearing aid device according to the invention.

FIG. 1 shows a hearing aid device 1 which can be worn in the ear and is known from the prior art, comprising a housing 2, which, when the hearing aid device is being worn, has a first housing region facing the eardrum of a user and a second housing region facing away from the ear drum. The latter is usually referred to as a faceplate 3. The hearing aid device 1 is crossed between the first and the second housing region by a ventilation channel 4 for ventilating the auditory canal volume enclosed by the hearing aid device 1 when in the worn state. At least one microphone 5 for receiving an acoustic input signal and converting said signal into an electrical input signal, a signal processing unit 6 for the processing and frequency-dependent amplification of the electrical input signal and for generating an electrical output signal as well as a receiver 7 for converting the electrical output signal into an acoustic output signal, which is fed to the ear of the user by way of an acoustic channel 13 is located in the housing 2 of the hearing aid device 1. A voltage source 14 in the form of a battery or rechargeable battery also exists to supply voltage to the electronic components of the hearing aid device 1. The faceplate 3 is partially detachable from the remaining housing 2 in order to insert/attach the electronic components into the hearing aid device 1. The faceplate 3 may if necessary also be provided with control elements (not shown).

To protect the receiver 7 from the penetration of moisture and dirt, in particular in the form of cerumen, a cerumen protection facility 8 with a non-porous and thus gas-impermeable membrane is available. To ensure that the receiver 7 remains functional even with air pressure fluctuations, a barometric pressure equalization for the volume enclosed between the receiver 7 and the cerumen protection facility 8 is also needed. With the hearing aid device 1 known from the prior art in accordance with FIG. 1, a pressure equalization channel 4A is provided, the one end of which opens into the ventilation channel 4 and the other end of which opens into the sound channel between the receiver 7 and the cerumen protection facility 8.

Figure 2:
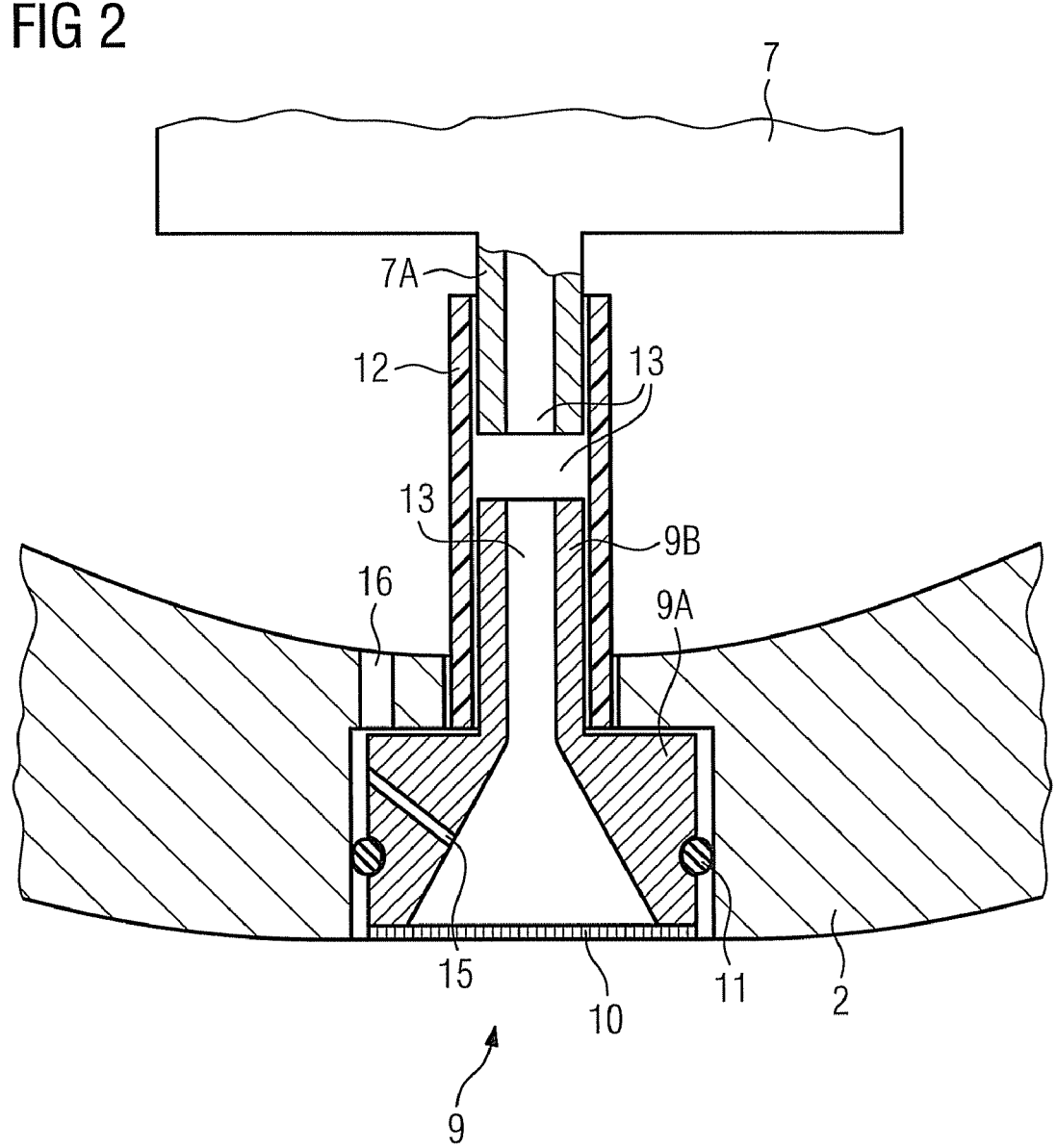

FIG. 2 shows an exemplary embodiment of a hearing aid device according to the invention. To be able to better identify the essential details, only the section of the hearing aid device which points in the direction of the eardrum when the hearing aid device is being worn is shown. A recess with a passage opening in the housing 2 of the hearing aid device forms the sound outlet opening of the hearing aid device here. FIG. 2 shows the sound outlet opening of the hearing aid device with a transducer protection facility 9 inserted therein. This includes a non-porous membrane 10, which is fastened to a membrane support 9A. The membrane support 9A itself forms a conical cavity, the diameter of which enlarges in the direction of the membrane 10. The side of the membrane support 9A opposite the membrane 10 extends into a tubular sound channel 9B. The receivers 7 with the sound outlet support 7A are also apparent from FIG. 2, with the latter forming the sound outlet opening of the receiver 7. The tubular end 9B of the transducer protection facility 9 is connected to the sound outlet support 7A of the receiver 7 by way of an elastic sound tube 12. A continuous sound channel 13 is thus produced between the receiver 7 and the membrane 10. In order to prevent acoustic sealing and also the penetration of moisture or dirt into the hearing aid device, the transducer protection facility 9 according to the exemplary embodiment also comprises an O-ring seal 11, which seals the transducer protection facility 9 against the housing 2 of the hearing aid device. The transducer protection facility 9 is also fixed to the housing 2 by means of the seal 11. The described design produces a detachable connection between the transducer protection facility 9 and the hearing aid device. A damaged transducer protection facility 9 with a suitable tool (not shown) can thus be exchanged if necessary with a new undamaged transducer protection facility 9. With a correspondingly snub embodiment of the transducer protection facility 9 and the recess in the housing 2 provided herefor, it is also possible to dispense with sealing means if necessary (e.g. the O-ring seal 11).

According to the invention, the transducer protection facility 9 according to the exemplary embodiment includes a pressure equalization channel 15, which generates a pressure equalization between the sound channel 13 and the interior of the hearing aid device surrounded by the housing 2. In the exemplary embodiment, one end of the pressure equalization channel 15 opens into the funnel-shaped cavity of the transducer protection facility 9. The opposite end opens into a section of the side of the transducer protection facility 9, which lies between the O-ring seal 11 and the interior of the hearing aid device. The penetration of dirt or moisture into the pressure equalization channel 15 is therefore prevented when the membrane and the O-ring seal 11 are functioning correctly.

A passage opening through the housing 2 forms the second subsection 16 of the pressure equalization channel 15, 16 between the sound channel 13 and the interior of the hearing aid device. The acoustic properties of the pressure equalization channel 15, 16 are determined by the cross-section thereof and in particular the region of the smallest cross-section. As the pressure equalization channel 15, 16 can result in unintentional feedback, as minimal a cross-section as possible is preferred. In the exemplary embodiment, the cross-section of the second subsection 16 of the pressure equalization channel 15, 16 extending through the housing 2 is greater than the cross-section of the first subsection 15 extending through the converter protection facility 9. If as a result of a damaged membrane 10 the pressure equalization channel becomes blocked, this will highly probably occur within the region of the smallest cross-section and thus in the first subsection 15 extending within the transducer protection facility. A blockage in this region may have been easily eliminated by replacing the faulty converter protection facility 9.

Overall the invention provides an easily operable and cost-effective possibility of barometrically pressure equalizing the receiver.

The transducer protection facility shown by way of example for the receiver can also be used similarly to protect one or several microphones of a relevant hearing aid device.

The invention claimed is:

1. A hearing aid device, comprising:
  a housing;
  an input transducer that receives an acoustic input signal and converts the acoustic input signal into an electrical input signal;
  a signal processing unit that processes and amplifies the electrical input signal and generates an electrical output signal;
  an output transducer that converts the electrical output signal into an acoustic output signal;
  a transducer protection device that is detachably connected to the hearing aid device and comprises a membrane support, a membrane, and a sound channel;
  an O-ring seal that seals the transducer protection device against the housing and provides the detachable connection between the transducer protection device and the hearing aid device; and
  a pressure equalization channel comprising:
    a first section that extends through the membrane support for a barometric pressure equalization of the sound channel,
    a second section that extends through the housing of the hearing aid device and has a larger cross-section than the first section of the pressure equalization channel.

2. The hearing aid device as claimed in claim 1, wherein the input transducer comprises a microphone.

3. The hearing aid device as claimed in claim 1, wherein the output transducer comprises a receiver.

4. The hearing aid device as claimed in claim 1, wherein the housing and the second section of the pressure equalization channel are integrated by a rapid prototyping method.

5. The hearing aid device as claimed in claim 1, wherein the membrane is an air-impermeable and non-porous membrane.

6. The hearing aid device as claimed in claim 1, wherein the transducer protection device protects the input transducer or the output transducer against contamination.

7. A transducer protection device inserted into a housing of a hearing aid device, comprising:
   a membrane support;
   a membrane;
   a sound channel;
   an O-ring seal that seals the transducer protection device against the housing and provides a detachable connection between the transducer protection device and the hearing aid device; and
   a pressure equalization channel comprising:
      a first section that extends through the membrane support for a barometric pressure equalization of the sound channel,
      a second section that extends through the housing of the hearing aid device and has a larger cross-section than the first section of the pressure equalization channel.

\* \* \* \* \*